Figure 1:
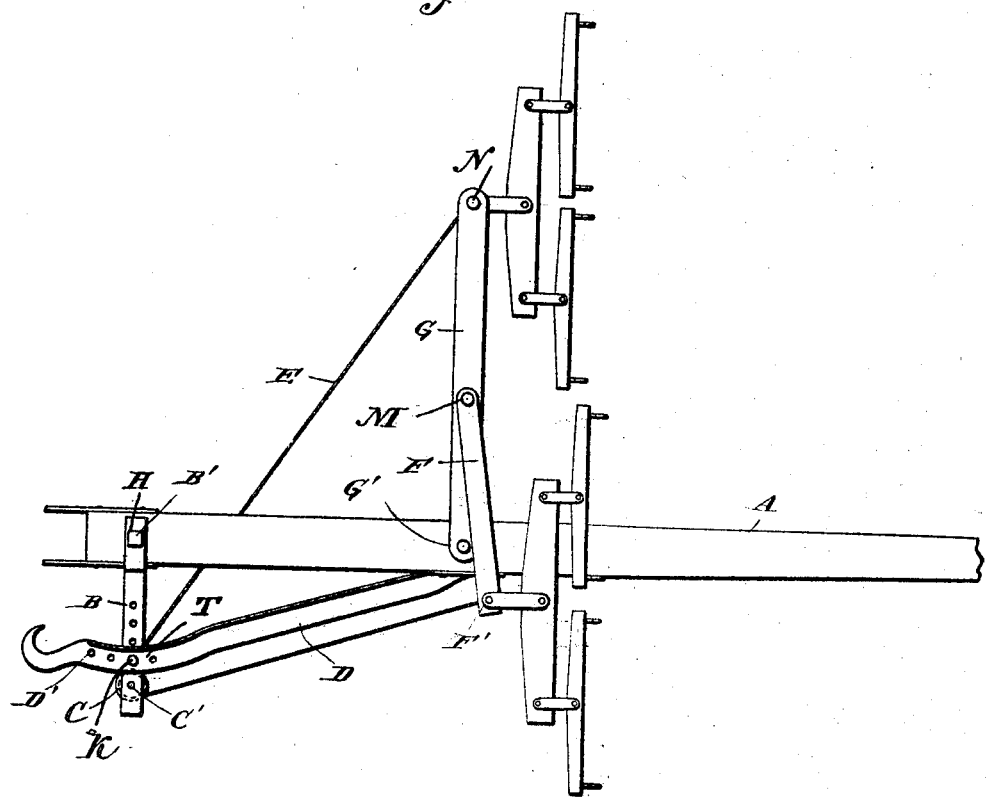
Figure 2:
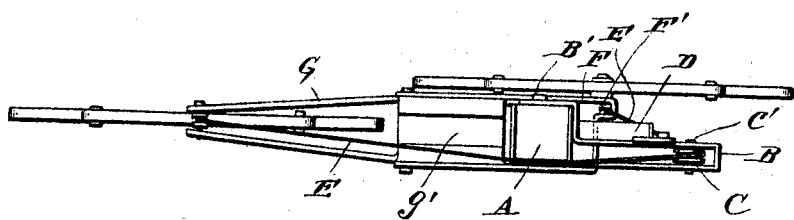

No. 624,918.  
C. FERM.  
DRAFT EQUALIZER.  
(Application filed Mar. 3, 1899.)  
Patented May 16, 1899.

(No Model.)

Witnesses:  
H. C. Olson  
Frank Lindberg

Inventor:  
Charles Ferm

UNITED STATES PATENT OFFICE.

CHARLES FERM, OF LINDSBORG, KANSAS.

DRAFT-EQUALIZER.

SPECIFICATION forming part of Letters Patent No. 624,918, dated May 16, 1899.

Application filed March 3, 1899. Serial No. 707,686. (No model.)

*To all whom it may concern:*

Be it known that I, CHARLES FERM, a citizen of the United States, residing at Lindsborg, in the county of McPherson and State of Kansas, have invented a new and useful improvement in equalizing the draft upon four horses that walk abreast in the pulling of a self-binder or harvester-machine, of which the following is a specification.

The nature of the work in the pulling of a self-binder in manner described necessitates, by reason of the peculiar construction of such machine, to group three (3) horses on one side of the tongue and only one horse on that side of the tongue that is nearer the grain. The sickle or knife on the harvester-machine that cuts the grain is about six feet long or more and extends beyond the horse that walks next to the grain. The resistance of the grain upon the sickle when at work tends to pull the tongue toward the grain. This sidewise pulling is called "side draft." This side draft is greater in green grain than in ripe grain of the same quality and quantity. It is also different in different thicknesses of the grain, as well as when there are different lengths of the sickle or knife used on the machine that cuts the grain. The grouping of three horses on one side of the tongue and only one horse on the side next to the grain aggravates this side draft, making the team that straddles the tongue do more than its share in the labor of pulling the machine. Having the pulling apparatus on the top of tongue adds neck-weight to the team that guides the machine.

My invention relates to the taking away, first, of the side draft; second, of the neck-weight, and, third, the adjusting of the machine to the work to be done. I attain these objects by the mechanism illustrated in the accompanying drawings.

Figure I is a top view of the entire machine. Fig. II is an end view.

The self-binder and harvester is not shown; neither are the horses. We must suppose their places to be filled for the purposes to be attained.

The invention connects only direct with the tongue A and brace D, which are part of the self-binder or harvester.

Similar letters refer to similar parts in both views.

By extending the draft from the center of tongue at bolt H, by extension-draft B, by a cable E, which is fastened to extension-draft G at N, running under tongue and over an adjustable or movable pulley C to retention-draft F and fastened there by bolt R, as shown in the drawings. This takes away all side draft when the machine is to do a certain amount of work is set therefore, also all neck-weight.

When a different amount of work is required of the machine, pulley C is then adjusted or moved. For instance, for doing less work the pulley C is moved nearer to tongue. The possibility of such a move may be seen by the drawings.

The extension-draft G is for the purpose of keeping the doubletree from falling onto the straddle-team that walks next to the grain and also serves as a support for retention-draft F, as shown in the drawings at M.

The retention-draft F is for the purpose of retaining the doubletree from falling into the grain by being attached by bolt M in the center of extension-draft G. This center connection has no bearing as to distance from tongue as connected with extension B and the adjustment of movable pulley C; but from the necessity of having a long play to prevent catch on tongue the center of extension-draft G is chosen as the movable fulcrum for retention-draft F to be attached to.

The extension-draft B serves the purpose of moving the fulcrum of draft from center of tongue to center pull or weight. It is movable on bolt H. H is a groove for pulley C and is attachable by bolt K to brace D at T, as shown in the drawings, and secures the desired result in taking away the side draft and adjustable to the work to be done.

The purpose of brace D, as stated, serves to connect the tongue with binder; but by its peculiar form, as shown in drawings, Fig. I, it serves as a rest for extension-draft B to be attached by bolt K to brace D, as shown by the drawings.

The purpose of pulley C is to let cable play back and forth over it as the different teams step back and forth in their work. It is adjustable in groove of extension-draft B, as shown in Fig. I, and can be moved to any place required, from near the tongue to the full extent of said extension-draft, as shown in drawings, Fig. I.

The cable E serves the purpose of attaching it to doubletrees at N and F', playing over pulley C under tongue, and serves to connect all parts of the device.

The parts above described are connected together and coöperate to produce a (the) useful result.

I claim—

1. In draft-equalizers, a pole A provided with a pivoted and perforated extension B having a groove therein, a pulley C pivoted in said groove and adjustable therein, and a perforated brace D, carried by the pole and adjustable on the extension B, all combined as set forth.

2. In draft-equalizers, the pole A provided with a perforated extension B carrying a pulley C, brace D adjustable on said extension, the side-draft bar G pivoted to pole A, the side-draft bar F pivoted midway to bar G, and cable E extending around said pulley and connected respectively to the outer ends of bars G and F, all combined as set forth.

3. In draft-equalizers, the pole A having the side-draft bar G pivoted thereto at its inner end, the side-draft bar F pivoted midway to bar G and extending to the other side of pole A, a cable connecting the outer ends of said bars, a bar carried by the pole and supporting the cable and doubletrees attached respectively to the outer extremities of said bars, all combined and arranged as set forth.

CHARLES FERM.

Witnesses:
FRANK LINDBERG,
H. O. OLSON.